United States Patent
Fischer

(10) Patent No.: US 6,810,733 B2
(45) Date of Patent: Nov. 2, 2004

(54) BALANCING SYSTEM FOR COMPENSATING FOR UNBALANCE OF A ROTATING MACHINE PART

(75) Inventor: Michael Fischer, Bubendorf (CH)

(73) Assignee: Rego-Fix AG (CH)

( * ) Notice: Subject to any disclaimer, the term of this patent is extended or adjusted under 35 U.S.C. 154(b) by 0 days.

(21) Appl. No.: 10/223,524

(22) Filed: Aug. 19, 2002

(65) Prior Publication Data

US 2003/0033873 A1 Feb. 20, 2003

(30) Foreign Application Priority Data

Aug. 20, 2001 (CH) ..................................... 2001 1534/01

(51) Int. Cl.[7] .............................. G01M 1/16; G05G 3/00
(52) U.S. Cl. ............................ 73/462; 73/487; 74/573 R
(58) Field of Search ................. 73/462, 487; 74/573 R; 409/131, 234

(56) References Cited

U.S. PATENT DOCUMENTS 5,263,995 A * 11/1993 Mogilnicki et al. ......... 409/131
6,071,219 A * 6/2000 Cook ........................ 409/131

FOREIGN PATENT DOCUMENTS

| DE | 35 40041 A1 | 5/1987 |
|---|---|---|
| DE | 199 20 699 A1 | 12/2000 |
| WO | WO 90/11862 | 10/1990 |

* cited by examiner

Primary Examiner—Hezron Williams
Assistant Examiner—Jacques M. Saint-Surin
(74) Attorney, Agent, or Firm—Hoffmann & Baron, LLP

(57) ABSTRACT

The balancing system includes two balancing rings which can be rotated, and secured in desired angular positions, in relation to one another and are provided with an unbalance. Annular grooves in the inner surface of the balancing rings and annular grooves which are situated opposite the aforementioned annular grooves and are located in a cylindrical outer surface of the rotating machine part accommodate an elastic ring which secures the balancing rings in the axial direction. A radial threaded bore which is not continuous in the outward direction and is located in the balancing rings accommodates a locking screw for securing the balancing rings.

7 Claims, 3 Drawing Sheets

BALANCING SYSTEM FOR COMPENSATING FOR UNBALANCE OF A ROTATING MACHINE PART

This application claims priority from Swiss Application No. 1534/01, filed on Aug. 20, 2001.

FIELD OF THE INVENTION

The invention relates to a system for compensating for unbalance of a rotating machine part, in particular of a tool holder in a machine tool.

BACKGROUND OF THE INVENTION

The use of increasingly powerful cutting materials and machines makes it possible for materials such as metal, plastics, wood, etc. to be machined at increasingly high cutting speeds. As a result, speeds above 10,000 rpm are quite customary nowadays. At these high speeds, the tools used have to be very well balanced.

Examples of possible consequences of an excessive residual unbalance are bearing damage to the spindle mounting, a poor cutting performance, insufficient surface quality and a vast reduction in the service life of the cutting edges of the tools.

If a plurality of tool components are assembled to form a tool, the entire set-up has to be balanced.

According to the current prior art, tool holders are balanced by the magnitude and the angle of the residual unbalance being determined on a balancing machine and these then being compensated for by material being removed by means of drilling, milling or grinding and/or by fitting compensating weights, e.g. screwing threaded pins into bores provided for this purpose.

These balancing methods involve high outlay and, nevertheless, frequently have unsatisfactory results.

Also known, as an alternative to these balancing methods, are systems in which, for compensating for unbalance, two rings with eccentric mass distribution are positioned with an angular offset. The rings are fastened with radially guided locking screws or by way of specific annular retaining means with axially guided locking screws. These systems have the disadvantage that, as a result of vibrations, the screws can come loose and fly off like bullets. This means that the rings on the tool holder are free and may likewise be slung away.

SUMMARY OF THE INVENTION

The object of the invention is thus to improve the balancing of rotating machine parts.

This is achieved according to one arrangement of the present invention by a system for compensating for unbalance of a rotating machine part, in particular of a tool holder in the machine tool which has a generally cylindrical outer surface. The system comprises two balancing rings which can be rotated and secured in desired angular positions in relation to one another and are provided with an unbalance. The balancing rings each have an inner surface with an annular groove formed therein and the outer surface of the rotating machine part has encircling annular grooves formed therein substantially opposite the annular grooves in the balancing rings. An elastic ring is contained in each of the annular grooves and encircling annular grooves. A locking element is provided for securing the balancing rings to the machine part.

BRIEF DESCRIPTION OF THE DRAWINGS

Preferred exemplary embodiments of the invention are described hereinbelow with reference to the attached drawings, in which.

DETAILED DESCRIPTION OF THE PREFERRED EMBODIMENTS

Figure 1:
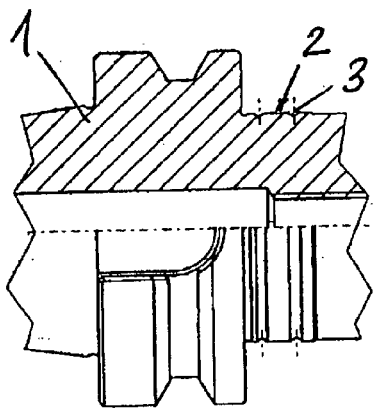
FIG. 1 shows an axial view, partly in section, of part of a tool holder.

As is shown in FIG. 1, a tool holder 1 has a cylindrical region 2 which has two encircling annular grooves 3 spaced apart one beside the other. The annular grooves have an essentially circle-segment-like cross section and serve for accommodating an elastic ring 4. Possible examples for this purpose are an elastomeric O-ring or an annular helical spring, etc.

Figure 2:
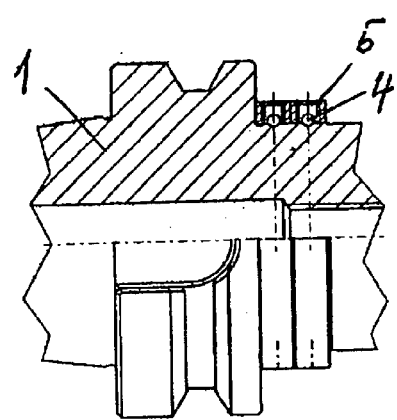
FIG. 2 shows the same view as FIG. 1, but with balancing rings in position.

In the state shown in FIG. 2, two independent, essentially identical balancing rings 5 are arranged on the cylindrical section of the tool holder. The two balancing rings 5 have an unbalance which can be displaced by rotation of the rings in circular fashion along the circumference of the tool holder. If the unbalances of the two rings are situated precisely opposite one another in the radial direction, they cancel each other out and the resulting unbalance is equal to zero. If the two unbalances are located on the same side, the resulting unbalance is at its greatest. All possibilities for precise coordination lie in between these two points.

The balancing rings may be unbalanced in various ways, for example as a result of eccentricity of the internal diameter and external diameter, as a result of axial bores or milled recesses on the internal or external diameter or as a result of axial or radial threaded bores for the introduction of threaded pins made of different materials, e.g. heavy metal, metal, titanium, aluminium, plastic, etc.

Figure 3:
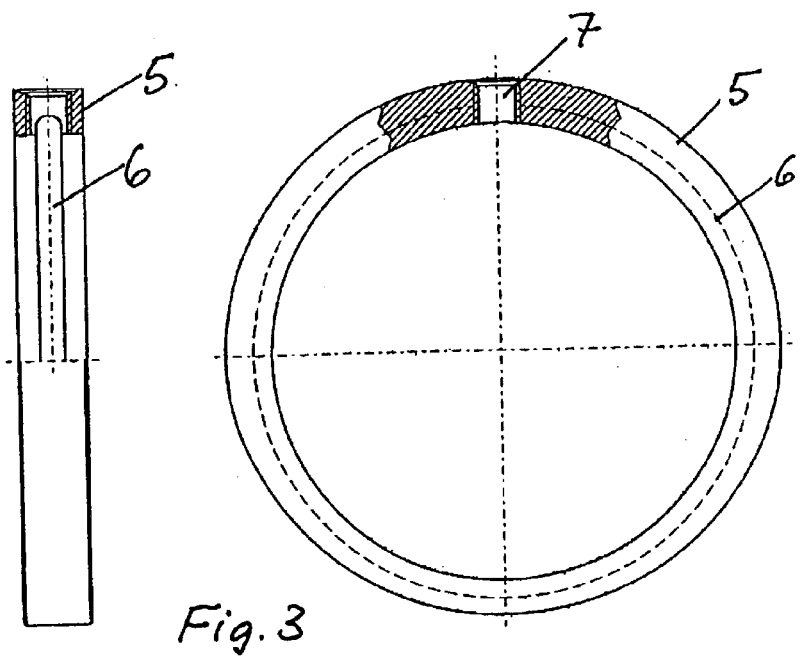
FIG. 3 shows a radial view and an axial view, partly in section, in each case of a balancing ring.

As the two views of an unbalancing ring 5 which are illustrated in FIG. 3 show, said rings likewise have, on their cylindrical inner side, an encircling annular groove 6 which, with the balancing ring 5 placed in position, is located precisely opposite the respective groove 3. The two grooves together enclose the elastic ring 4. The elastic ring retains the balancing ring in its axial position if its fastening should have come loose as a result of vibration, to be precise even at high speeds.

The profile of the encircling annular groove 6 in the balancing ring 5 has the greatest possible radius at the inner corners, in order that the cross section of the elastic ring, even at high speeds, can only be deformed to a small extent, since it is retained (enclosed) on the circumference.

The entire radial width of the groove, made up of the inner encircling groove 6 of the balancing ring 5 and of the outer encircling groove 3 of the tool holder 1, is selected such that the elastic ring 4 projects slightly into the outer groove of the tool holder and is retained in the inner groove 6 of the balancing ring.

In order that the balancing rings can be rotated by hand for adjustment purposes, the elastic ring has some play in the radial direction.

In order that the balancing rings can be pushed onto the cylindrical section of the tool holder, the annular groove 6 of the balancing rings is somewhat wider than the profile diameter of the elastic ring. Moreover, the balancing rings are provided with introduction and removal bevelling, in order for it to be easier for them to be fitted and removed. Both are located on the cylindrical circumference of the tool mount.

Figure 4:
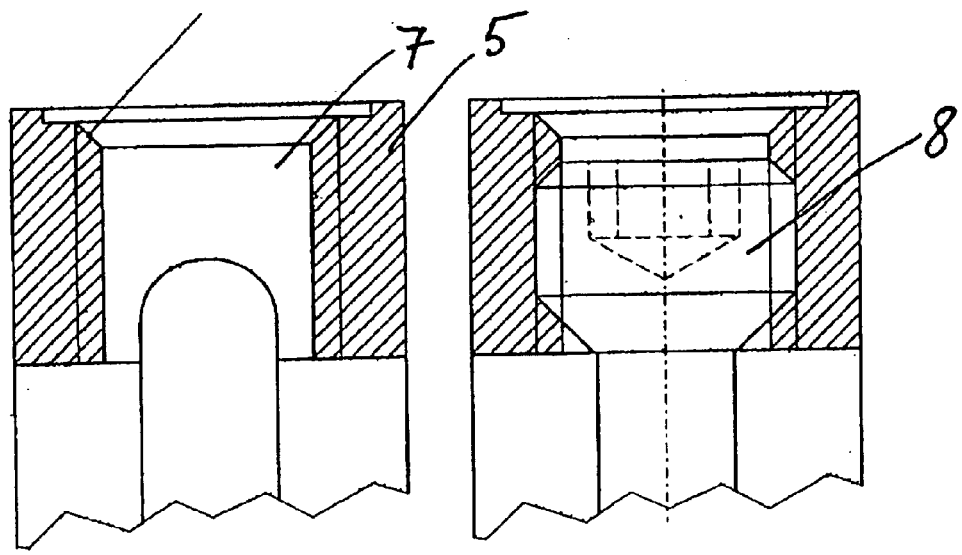
FIG. 4 shows an enlarged sectional illustration of the threaded bore for the adjusting screw, with and without the screw inserted.
Figure 5:
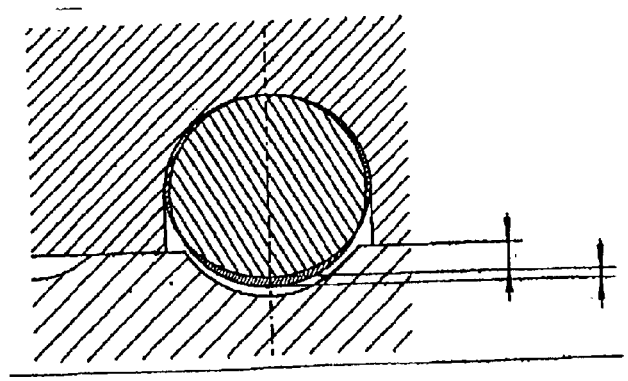
FIG. 5 shows an enlarged sectional illustration of the system for axial securing purposes.
Figure 6:
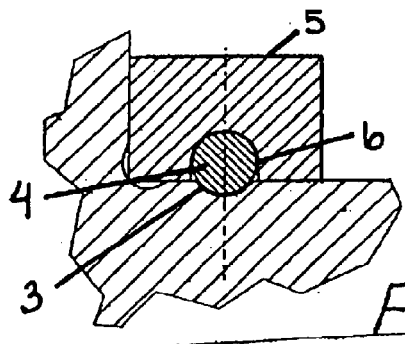
FIGS. 6–13 show sectional illustrations for illustrating the functioning of different variants.

A radial threaded bore 7 serves, as FIG. 4 shows in detail, for accommodating a locking screw 8 for securing the balancing ring 5 in a desired angular position. In order that this screw cannot fly off, it is the case, at the outer end of the threaded bore, that the thread, as a result of an impression, is not continuous. The locking screw is screwed into the thread from the inner side of the balancing ring. As soon as the rings are applied to the accommodating section with the elastic rings, the system is self-contained. It is no longer possible for the rings to drop off the holder, and the screws thus cannot be unscrewed from the threaded bore.

Figure 7:
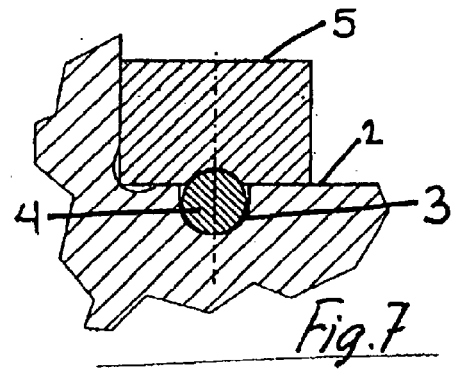
Figure 8:
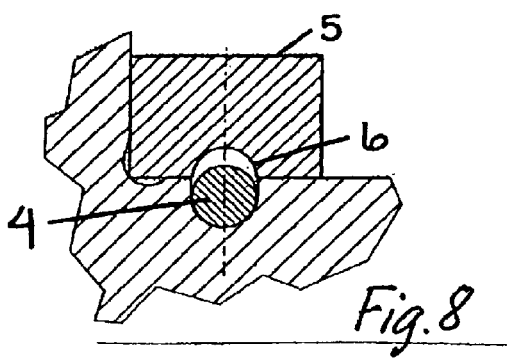
Figure 9:
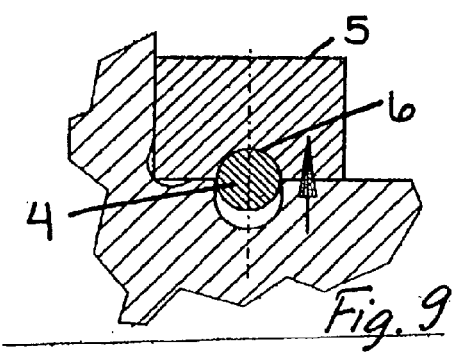

According to an alternative embodiment shown in FIG. 7, the encircling grooves 3 on the outer circumference of the cylindrical accommodating section 2 for the balancing rings 5 are formed such that the elastic ring 4 is retained in them. In the case of the exemplary embodiment shown in FIGS. 8 and 9, the encircling annular groove 6 in the balancing ring 5 is formed such that, at high speeds, the elastic ring 4 is expanded radially outwards by the centrifugal force and comes to rest in the groove 6 of the balancing ring 5 such that it cannot drop off.

Figure 10:
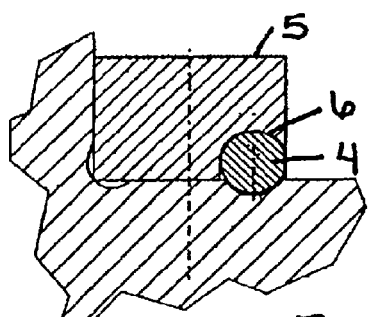
Figure 11:
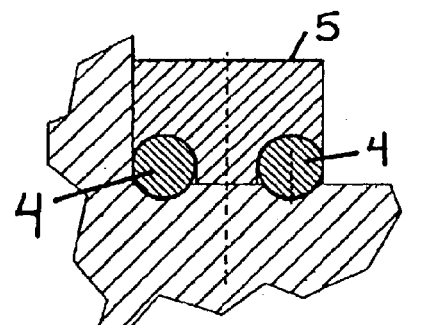
Figure 12:
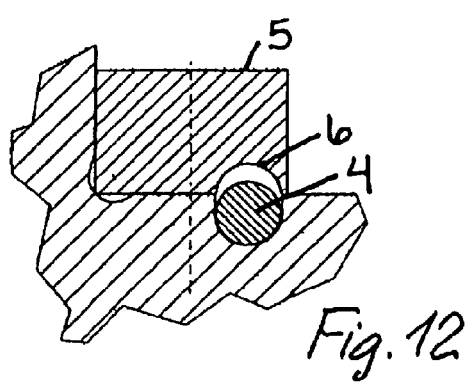
Figure 13:
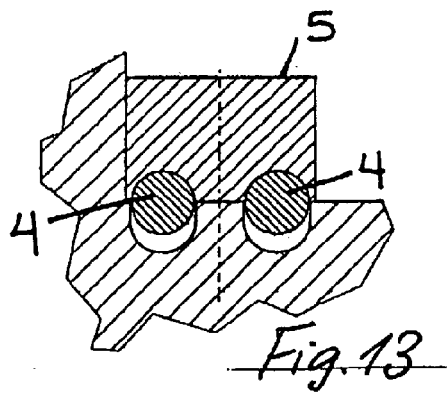

In the case of the embodiment shown in FIG. 10, the annular groove 6 in the balancing ring 5 is located asymmetrically on the border. FIG. 12 shows this variant for an elastic ring 4 retained in the tool holder. FIGS. 11 and 13 show variants which each have two elastic rings 4 per balancing ring 5.

All the embodiments have the advantage in relation to the known methods that they can be produced straightforwardly to good effect and to be secure.

Although the invention has been described using the example of a tool holder, rather than being restricted to this application it may be used for all rotating machine parts in the case of which balancing is necessary, e.g. grinding wheels, spindles, etc. As such, it should be appreciated that variations and modifications may be made to the preferred embodiments without departing from the contemplated scope of the present invention. Accordingly, the preferred embodiments are intended to be illustrative rather than limiting, the true scope of the invention being set forth in the claims appended hereto.

What is claimed is:

1. A system for compensating for unbalance of a rotating machine part, in particular of a tool holder in a machine tool which has a generally cylindrical outer surface, comprising two balancing rings arranged on the said cylindrical surface to be rotated, and secured in desired angular positions in relation to one another and provided with an unbalance, which can be displaced radially along the circumference of the tool holder, the balancing rings each having an inner surface with an annular groove formed therein, said cylindrical outer surface of the rotating machine part having encircling annular grooves formed therein substantially opposite the annular grooves in said balancing rings, an elastic ring being contained in each of the annular grooves and encircling annular grooves, and a locking element for securing the balancing rings in defined angular positions to said machine part.

2. A system according to claim 1, wherein said elastic rings comprise an elastically deformable material.

3. A system according to claim 1, wherein said elastic rings comprise a helical spring.

4. A system according to claim 1, wherein said rotating machine part is a tool holder and the annular grooves in the inner surface of the balancing rings are deeper than those in a cylindrical outer surface of the tool holder and accommodate the elastic ring.

5. A system according to claim 1, wherein said locking element comprises a threaded locking screw.

6. A system according to claim 5, wherein at least on of said balancing rings has a threaded bore to accommodate said threading locking screws.

7. A system according to claim 6, wherein said threaded bore comprises a discontinuous thread.

* * * * *